(12) United States Patent  
Si et al.

(10) Patent No.: US 8,779,702 B2  
(45) Date of Patent: Jul. 15, 2014

(54) MOTOR CONTROL SYSTEM IMPLEMENTING FIELD WEAKENING

(75) Inventors: Baojun Si, Dunlap, IL (US); Seok-Hee Han, Dunlap, IL (US); Osama Mohammad Alkhouli, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 388 days.

(21) Appl. No.: 13/153,845

(22) Filed: Jun. 6, 2011

(65) Prior Publication Data

US 2012/0306423 A1 Dec. 6, 2012

(51) Int. Cl.
*H02P 21/00* (2006.01)
(52) U.S. Cl.
USPC ...................................... 318/400.02; 318/432
(58) Field of Classification Search
USPC ........ 318/432, 434, 727, 400.02, 400.39, 801
See application file for complete search history.

(56) References Cited

U.S. PATENT DOCUMENTS

| | | | |
|---|---|---|---|
| 6,104,159 A | 8/2000 | Seok | |
| 6,762,573 B2 | 7/2004 | Patel | |
| 6,763,622 B2 * | 7/2004 | Schulz et al. | 318/700 |
| 6,924,617 B2 * | 8/2005 | Schulz et al. | 318/701 |
| 7,015,667 B2 * | 3/2006 | Patel et al. | 318/432 |
| 7,023,168 B1 | 4/2006 | Patel et al. | |
| 7,211,984 B2 * | 5/2007 | Patel et al. | 318/778 |
| 7,443,120 B2 | 10/2008 | Tobari et al. | |
| 7,759,886 B2 | 7/2010 | Gallegos-Lopez et al. | |
| 8,242,721 B2 * | 8/2012 | Kwon et al. | 318/400.02 |
| 2009/0001924 A1 | 1/2009 | Sopko et al. | |
| 2009/0115362 A1 * | 5/2009 | Saha et al. | 318/400.09 |

OTHER PUBLICATIONS

Jahns, Thomas M., "Flux-Weakening Regime Operation of an Interior Permanent-Magnet Synchronous Motor Drive," *IEEE Transactions on Industry Applications*, vol. IA-23, No. 4, Jul./Aug. 1987, pp. 681-689.

Kwon, Tae-Suk et al., "Novel Flux-Weakening Control of an IPMSM for Quasi-Six-Step Operation," *IEEE Transactions on Industry Applications*, vol. 44, No. 6, Nov./Dec. 2008, pp. 1722-1731.

* cited by examiner

*Primary Examiner* — Rina Duda
(74) *Attorney, Agent, or Firm* — Finnegan, Henderson, Farabow, Garrett & Dunner LLP

(57) ABSTRACT

A control system for use with a motor is disclosed. The control system may have a controller that is configured to receive a torque command for the motor and receive a rotor angular velocity signal indicative of an angular velocity of a rotor of the motor. The controller may also be configured to generate a field weakening command by adding a field weakening adjustment signal to the rotor angular velocity signal, and generate a torque voltage command and a flux voltage command based on the torque command and the field weakening command. Further, the controller may be configured to convert the torque voltage command and the flux voltage command into phase voltage commands and output the phase voltage commands.

17 Claims, 4 Drawing Sheets

MOTOR CONTROL SYSTEM IMPLEMENTING FIELD WEAKENING

TECHNICAL FIELD

The present disclosure relates generally to a control method for a motor, and more particularly, to a control method that generates a field weakening command.

BACKGROUND

Motors, such as permanent magnet motors, are used to provide mechanical power in a variety of applications, for example, to drive traction devices in transportation and construction applications. Motors are provided with a current to generate a mechanical torque output that may drive the traction devices. That is, currents within components (e.g. field windings) of the motor create an electromagnetic flux, and a rotating member of the motor is caused to rotate by interaction with the magnetic flux.

The current applied to a motor can be regarded as a vector with two components: a torque current component $i_q$, and a flux current component $i_d$. By controlling these current components, the electromagnetic flux and output torque of the motor can be controlled. For example, an inverter can be controlled to apply one or more desired voltages to the motor, causing desired torque and flux current components to flow within the motor, thus inducing a desired mechanical torque output from the motor in accordance with known principles.

During normal operation of a motor, the motor will generate a counter-electromotive force ("back EMF") that opposes the voltage applied to the motor. At certain speeds, the back EMF may become greater than the voltage applied to the motor, causing the motor to operate undesirably or to cease operation entirely. A method known as "field weakening" is employed to reduce the back EMF (i.e. maintain the back EMF at or below a desired level for operation of the induction motor) and allow the motor to operate at desired speeds.

Field weakening methods generally include reducing the flux of a motor when the motor speed increases beyond a predetermined speed threshold, and maintaining the flux of the motor at or above a normal flux level when the motor speed is below a predetermined threshold. Flux can be reduced by delivering corresponding voltage commands to an inverter. Field weakening methods can further include increasing the torque current component via corresponding voltage commands such that the mechanical torque output of the motor is maintained at or above a level necessary for efficient operation of the motor. A current regulator may be used to ensure that the correct voltage commands are being applied to the inverter.

During a field weakening method, the current regulator may be limited by the voltage on the DC bus. If an unachievable current command is provided to the current regulator, the current regulator may saturate, deteriorating its performance. Moreover, such a current command may trigger an overcurrent fault of the current regulator during motor deceleration. Therefore, a method is needed that will provide achievable current commands for controlling the current regulator.

One method of controlling a motor during a field weakening operation is described in U.S. Pat. No. 7,023,168 (the '168 patent) issued to Patel et al. on Apr. 4, 2006. The '168 patent describes a field weakening motor control system that includes a dominant feedforward stator flux value and a feedback flux correcting term. The two flux terms are added together and limited to a maximum flux at low speed that guarantees constant flux in a constant torque region.

Although the system of the '168 patent may increase the efficiency of a motor through field weakening, its reliance on feedback and feedforward flux values may be unnecessarily resource intensive. Because flux generally is not directly measured in a motor control system, the method proposed by the '168 patent requires calculating flux from other measured values. This may slow processing time by adding unnecessary calculations and/or components. Calculating field weakening commands based on indirectly calculated values may also reduce the accuracy of the field weakening commands.

The disclosed system is directed to overcoming one or more of the problems set forth above and/or other problems of the prior art.

SUMMARY

In one aspect, the present disclosure is directed to a control system for a motor. The control system may include a motor and a sensor configured to generate a rotor angular velocity signal indicative of an angular velocity of a rotor of the motor. The control system may also include a controller that is configured to receive a torque command and receive the rotor angular velocity signal from the sensor. The controller may also be configured to generate a field weakening command for the motor by adding a field weakening adjustment signal to the rotor angular velocity signal.

In another aspect, the present disclosure is directed to a method of controlling a motor. The method may include receiving a torque command and signal indicative of an angular velocity of a rotor of the motor. The method may also include generating a field weakening command by adding a field weakening adjustment to the rotor angular velocity. Further, the method may include outputting AC voltage signals to the motor based on the field weakening command.

In yet another aspect, the present disclosure is directed to a controller for a motor. The controller may include a current command generator configured to receive a torque command and a field weakening command, and generate a torque current command and a flux current command. The controller may also include a current regulator configured to receive the torque current command and the flux current command, generate a torque voltage command and a flux voltage command, and use the torque voltage command and the flux voltage command to control voltage signals applied to the motor. Further, the controller may include a field weakening command generator configured to generate the field weakening command received by the current command generator by adding a field weakening adjustment signal to a rotor angular velocity signal.

DETAILED DESCRIPTION

Figure 1:
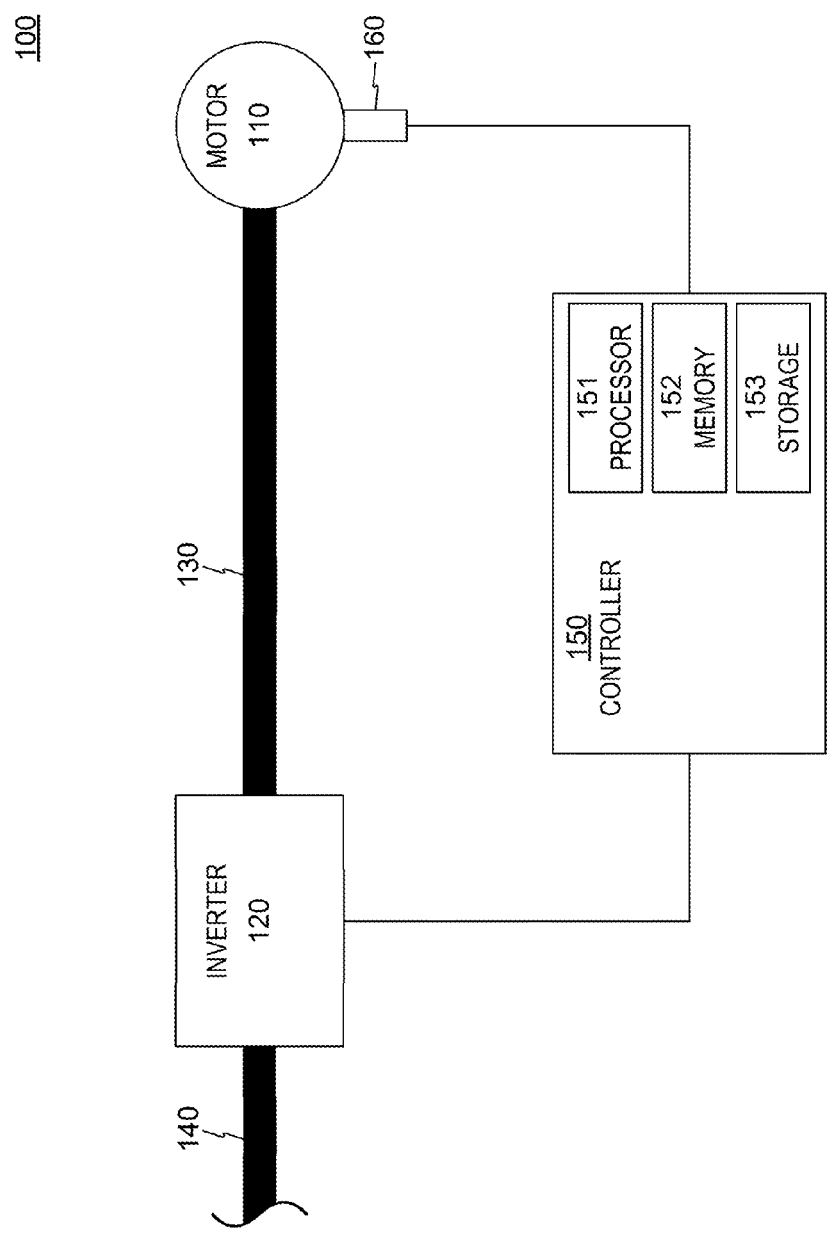
FIG. 1 is a diagrammatic illustration of an exemplary disclosed motor control system.

FIG. 1 illustrates an exemplary control system 100 having a motor 110, an inverter 120, a controller 150, and a sensor 160. Control system 100 may receive a direct current ("DC")

signal from a DC bus 140, convert the DC signal to one or more voltages, and produce one or more AC currents to drive a mechanical output of motor 110. The mechanical output of motor 110 may be at least partially controlled by inverter 120 and controller 150. As such, control system 100 may be associated with and/or included in a machine that is driven by a mechanical output of motor 110. For example, the mechanical output of motor 110 may drive traction devices in transportation vehicles and construction machinery, etc.

Motor 110 may be generally operable to receive one or more alternating current ("AC") signals from an AC bus 130 and use them to produce a mechanical power output having a speed and a torque. In some embodiments, motor 110 may include a three-phase interior permanent magnet (IPM) motor configured to receive three-phase AC power from inverter 120. In other embodiments, motor 110 may include any type of motor known in the art, such as, for example, a single-phase motor or a two-phase motor. The AC signals from AC bus 130 may include one or more AC voltage signals, which may cause one or more AC currents to flow through one or more components of motor 110. It should be appreciated that motor 110 may also be operable to receive mechanical power and use it to generate variable-frequency, variable-voltage AC power (e.g. operable as an AC generator), as is known in the art.

Motor 110 may generally include a stationary component (e.g. a stator, not shown) and a rotating component (e.g. a rotor, not shown). The one or more AC signals may be delivered to the stator, and may generate a changing magnetic field (i.e. a magnetic flux). It should be appreciated that one or more AC signals may additionally or alternatively be delivered to the rotor of motor 110 via, for example, one or more slip rings. The changing magnetic field may interact with one or more AC currents of motor 110 to cause a force such as, for example, a Lorentz force, to act upon one or more components of motor 110. For example, the Lorentz force may cause the rotor to rotate. In this manner, the mechanical output of motor 110 may embody a rotation of a shaft (not shown) that may be mechanically coupled with the rotor.

The electromagnetic flux and torque output of motor 110 may be at least partially determined by the one or more AC signals from AC bus 130. The one or more AC currents of motor 110 may be regarded as a vector current having a torque current component $i_q$ and a flux current component $i_d$. As such, the electromagnetic flux and torque of motor 110 may be at least partially managed by controlling the one or more AC signals such that the one or more AC currents induced thereby may include a desired torque current component and/or a desired flux current component. One skilled in the art will appreciate that during operation of motor 110, motor 110 may generate a back EMF in proportion to the angular velocity of the rotor of motor 110. As discussed above, if the back EMF is allowed to become large, it may cause motor 110 to operate undesirably or inefficiently. While the back EMF may increase in proportion to the rotor angular velocity of motor 110, field weakening may be employed whereby one or more AC signals may be controlled to reduce the back EMF of motor 110. Such a field weakening may be based, in part, on the rotor angular velocity of motor 110, for example.

Sensor 160 may be configured to sense the rotor angular velocity of motor 110. For example, sensor 160 may embody a magnetic pickup sensor configured to sense an angular velocity of the rotor of motor 110 and produce a signal corresponding to the angular velocity. Sensor 160 may be disposed adjacent the rotor of motor 110. In other embodiments sensor 160 may be disposed adjacent a shaft (not shown) mechanically coupled to the rotor, or on any other suitable component of control system 100 to produce a signal corresponding to the rotor angular velocity of motor 110.

Sensor 160 may alternatively or additionally be included within one or more other components of control system 100 or an associated machine. For example, sensor 160 may be included in motor 110. Further, sensor 160 may alternatively embody a virtual sensor and the signal corresponding to the rotor angular velocity of motor 110 may embody a self-sensing signal, whereby the speed of motor 110 may be determined by motor 110 and/or an associated machine. The speed of motor 110 may also be determined by any other means known in the art. In one embodiment, the signal generated by sensor 160 may indicate the rotational speed of motor 110 in Hz (i.e. radians per second). Alternatively, the signal generated by sensor 160 may indicate the rotational speed of motor 110 in any appropriate unit such as, for example, revolutions per minute ("rpm"), revolutions per second ("rps"), etc.

Inverter 120 may generally be operable to receive DC power and use it to generate one or more AC voltage signals. For example, inverter 120 may generate one or more AC voltage signals to power motor 110. That is, inverter 120 may receive DC power from DC bus 140, and deliver the one or more AC voltage signals to motor 110 via AC bus 130. The one or more AC voltage signals generated by inverter 120 may include one or more AC voltages such that, when applied to motor 110 via AC bus 130, the one or more AC voltages may cause one or more AC currents to flow through one or more components of motor 110, as discussed above.

Inverter 120 may embody any inverter known in the art. That is, inverter 120 may embody any combination of power electronics, hardware, and/or software operable to convert DC power to AC power. For example, inverter 120 may include a three-phase inverter configured to generate three current signals to power motor 110. In certain embodiments, inverter 120 may be a pulse-width modulation (PWM) inverter. Further, inverter 120 may operate through the use of one or more switches or similar devices to convert DC power to AC power. For example, inverter 120 may include any number of thyristors, insulated gate bipolar transistors (IGBTs), metal-oxide-semiconductor field-effect transistors (MOSFETs), bipolar junction transistors (BJTs), resistors, capacitors, inductors, diodes, etc., configured to operate according to the present disclosure. In still other embodiments, inverter 120 may be operable in a reverse mode wherein inverter 120 acts as a converter (i.e. inverter 120 may receive one or more AC signals from AC bus 130 and use them to generate DC power delivered to DC bus 140).

Frequencies and/or voltages of the one or more AC voltage signals generated by inverter 120 may be controllable. Thus, the one or more AC voltage signals generated by inverter 120 may be controlled such that the AC currents caused by applying the AC voltages to motor 110 may include the desired torque current component and the desired flux current component of motor 110. That is, the desired torque current component and the desired flux current component may correspond to one or more desired voltages, switch timings, and/or operating positions of one or more switches of inverter 120. One or more of these desired values may be communicated to inverter 120 in the form of a voltage command. That is, inverter 120 may be configured to receive a voltage command indicative of the desired current components. For example, inverter 120 may be configured to receive the voltage command from controller 150. In some embodiments, the voltage command may include a plurality of voltage commands. The voltage command may indicate switch timings and/or operating positions of the one or more switches of inverter 120 such that the one or more AC currents caused by the one or more AC voltage signals generated by inverter 120 may include the desired current components. In one embodiment, the voltage command may include one or more gate commands indicative of the switch timings and/or operating positions of the one or more switches of inverter 120. In another embodiment, the voltage command may include one or more current commands including a signal indicative of the desired torque current component (i.e. a torque current command) and a signal indicative of the desired flux current component (i.e. a flux current command), and inverter 120 may determine the switch timings and/or operating positions of the one or more switches of inverter 120 based on the voltage command. In yet another embodiment, the voltage command may include one or more signals indicative of the desired voltages, and inverter 120 may determine the switch timings and/or operating positions of the one or more switches of inverter 120 based on the voltage command.

Controller 150 may generally be operable to generate one or more voltage commands to be delivered to inverter 120 based on a rotor angular velocity and a received torque command. For example, controller 150 may be communicatively coupled with sensor 160 to receive a rotor angular velocity signal, and communicatively coupled with inverter 120 to deliver the voltage command thereto. Controller 150 also may be communicatively coupled to an operator input (not shown) to receive a torque command for motor 110. For example, the operator input may include, e.g., a device such as a pedal or lever, a computer input, or any other mechanical, electrical, or electromechanical device by which an operator may send commands to controller 150. In an embodiment where the operator input is an acceleration pedal on a vehicle, controller 150 may receive a torque command responsive to the degree to which the operator depresses the pedal. Controller 150 may thus control the frequencies and/or voltages of the one or more AC signals generated by inverter 120 in accordance with the monitored rotor angular velocity of motor 110 and the received torque command.

Controller 150 also may be communicatively coupled with motor 110 to receive signals generated thereby and/or to deliver signals thereto. Further, controller 150 may include a controller responsible for one or more other components, such as, for example, an engine control module, an inverter controller, etc. Controller 150 may alternatively or additionally be communicatively coupled with an external computer system.

As shown in FIG. 1, controller 150 may include a processor 151, a memory 152, and a storage 153. Processor 151 may include one or more processors or microprocessors that may be capable of processing the rotor angular velocity signal received from sensor 160. Numerous commercially available microprocessors, microcontrollers, digital signal processors (DSPs), and other similar devices may be configured to perform the functions of processor 151. Memory 152 may include one or more storage devices configured to store information used by processor 151 to perform certain functions related to disclosed embodiments. For example, memory 152 may store one or more motor control programs loaded from storage 153 or elsewhere that, when executed, enable controller 150 to process the rotor angular velocity signal, process a torque command from an operator input, perform field weakening calculations, and generate and send voltage commands to inverter 120. Storage 153 may include a volatile or non-volatile, magnetic, semiconductor, tape, optical, removable, nonremovable, or other type of storage device or computer-readable medium. Controller 150 may also include one or more of an application-specific integrated circuit (ASIC), a field-programmable gate array (FPGA), a computer system, and a logic circuit, configured to allow controller 150 to function in accordance with disclosed embodiments. Thus, the memory of controller 150 may include, for example, the flash memory of an ASIC, flip-flops in an FPGA, the random access memory of a computer system, a memory circuit contained in a logic circuit, etc. Further, controller 150 may include a controller responsible for one or more other components, such as, for example, an engine control module or an inverter controller. Controller 150 may alternatively or additionally be communicatively coupled with an external computer system.

Figure 2:
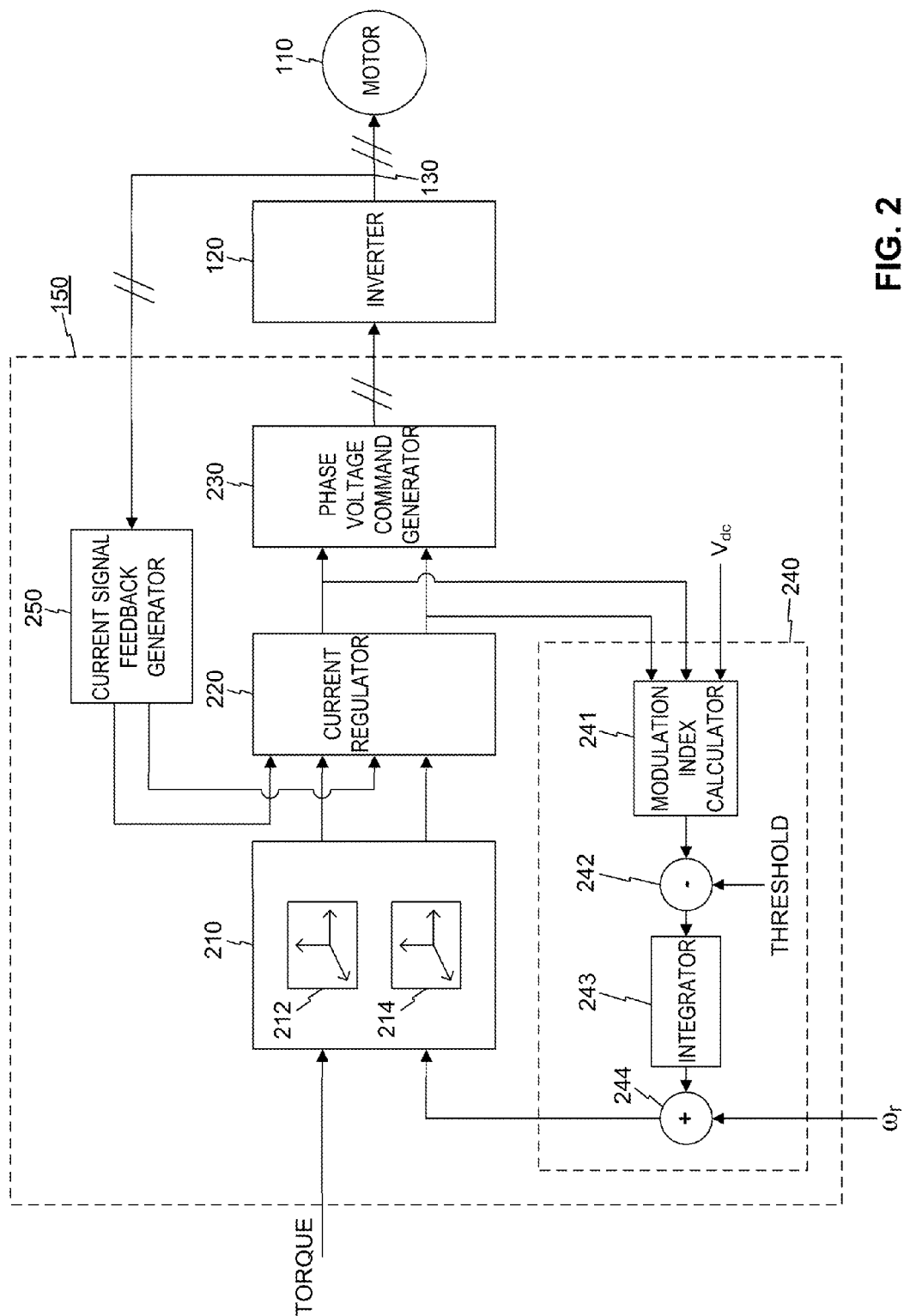
FIG. 2 is a diagrammatic illustration of an exemplary disclosed controller that may be incorporated into the motor control system of FIG. 1.

FIG. 2 illustrates an exemplary embodiment of controller 150. Controller 150 may include a current command generator 210, a current regulator 220, a phase voltage command generator 230, a field weakening command generator 240, and a current signal feedback generator 250. Although the components included in controller 150 are shown as separate components, they may be implemented in any combination of hardware and/or software. For example, in one embodiment, the components in controller 150 shown in FIG. 2 may be implemented in the form of software stored on one or more of memory 152 and/or storage 153 that, when executed by processor 151, enable controller 150 to perform functions related to the disclosed embodiments.

Current command generator 210 may include a torque current command lookup table 212 and a flux current command lookup table 214. Torque current command lookup table 212 may generally be a three-dimensional lookup table that accepts a torque command and a field weakening command for motor 110 (discussed in greater detail below), and outputs a corresponding torque current command. The torque current command may correspond to the torque current component $i_q$ of the current to be applied to the motor. Likewise, flux current command lookup table 214 may generally be a three-dimensional lookup table that accepts a torque command and a field weakening command, and outputs a corresponding flux current command. The flux current command may correspond to the flux current component $i_d$ of the current to be applied to the motor. The generation of torque current command lookup table 212 and flux current command lookup table 214 will be discussed in greater detail below with respect to FIG. 3. In some embodiments, the two lookup tables may be stored in memory 152 and/or storage 153 as a single table or as two or more separate tables.

Current regulator 220 may receive the torque current command and the flux current command from current command generator 210 and generate a current-regulated torque voltage command and a current-regulated flux voltage command. Current regulator 220 may be any type of current regulator known in the art and may be implemented in software, hardware, or a combination thereof.

Phase voltage command generator 230 may receive the torque voltage command and the flux voltage signal from current regulator 220 and may generate phase voltage commands. In one embodiment, phase voltage command generator 230 may be a DQ-to-ABC converter that converts the torque and flux voltage commands in the DQ coordinate plane into AC three phase voltage commands. In other embodiments, voltage signal coordinate converter may generate two, four, five, or any number phase voltage commands. In some embodiments, phase voltage command generator 230 may be included in controller 150, as shown in FIG. 2. In other embodiments phase voltage command generator 230 may be included in inverter 120. In embodiments where inverter 120 is a PWM inverter, inverter 120 may include phase voltage command generator 230 and may receive the torque voltage command and flux voltage command from current regulator 220. In still other embodiments, inverter 120 may be included in controller 150.

Inverter 120 may receive the phase voltage commands from phase voltage command generator 230 and may generate corresponding AC voltage signals that may be sent to motor 110. For example, inverter 120 may apply the AC voltage signals to stator windings on motor 110 based on the phase voltage commands received from phase voltage command generator 230, which may result in forces being applied to the rotor of motor 110, causing the rotor to rotate.

Current signal feedback generator 250 may receive AC current feedback signals from inverter 120 and may generate a torque feedback current signal and a flux feedback current signal. In some embodiments, current signal feedback generator 250 may include a coordinate converter that is inverse to phase voltage command generator 230. For example, if phase voltage command generator 230 is a DQ-to-ABC converter, then current signal feedback generator 250 may include an ABC-to-DQ coordinate converter. Current signal feedback generator 250 may provide the torque feedback current signal and the flux feedback current signal to current regulator 220. In one embodiment, current regulator 220 may compare the torque feedback current signal to the torque current command and may compare the flux feedback current signal to the flux current command. For example, current regulator 220 may determine if the difference between the torque current command and the torque feedback current signal is within a predetermined threshold. If the difference is not within a predetermined threshold, current regulator 220 may, instead of outputting a torque voltage command according to the torque current command, modify the torque voltage command to correspond to some other current command, such as the average of the torque current command and the torque feedback current signal, for example. A similar comparison may be performed for the flux current command and flux feedback current signals.

Field weakening command generator 240 may receive the torque voltage command and the flux voltage command from current regulator 220, a rotor angular velocity signal, and a DC bus value $V_{dc}$, and generate the field weakening command that is applied to current command generator 210. In some embodiments, the rotor angular velocity signal may be received from sensor 160. In some embodiments, the DC bus value $V_{dc}$ may be the maximum DC bus voltage of DC bus 140. In other embodiments, the DC bus value $V_{dc}$ may a predetermined percentage of the maximum DC bus voltage. The DC bus value $V_{dc}$ may be stored in memory 152 and/or storage 153 of controller 150, for example. Field weakening command generator 240 may include a modulation index calculator 241, a subtractor 242, an integrator 243, and an adder 244.

Modulation index calculator 241 may receive the torque voltage signal, the flux voltage signal, and the DC bus signal and generate a modulation index. In one embodiment, modulation index calculator 241 may generate the modulation index as equal to the square root of the sum of squares of the flux voltage signal and the torque voltage signal divided by the DC bus signal. In other words, modulation index calculator 241 may generate the modulation index in accordance with the following equation:

$$\text{Modulation Index} = \frac{\sqrt{Vd^2 + Vq^2}}{Vdc} \quad (1)$$

where $V_d$ equals the flux voltage signal, $V_q$ equals the torque voltage signal, and $V_{dc}$ equals the DC bus signal.

Subtractor 242 may subtract a predetermined modulation threshold value from the modulation index calculated by modulation index calculator 241. The modulation threshold value may be stored in memory 152 and/or storage 153 of controller 150, for example. In other embodiments, the modulation threshold value may be retrieved by controller 150 from an external source. In some embodiments, the modulation threshold value may be any number between 0 and 1. In certain embodiments, the modulation threshold value may be empirically determined to be the value that provides achievable current commands based on the DC bus voltage for field weakening operations. For example, the modulation threshold value may be approximately 0.95. Additionally, the modulation threshold value may be configurable at any time, e.g., by interfacing with controller 150.

Integrator 243 may integrate the signal received from subtractor 242 to generate a field weakening adjustment signal and send the field weakening adjustment signal to adder 244. In some embodiments, integrator 243 may include an anti-windup control mechanism that prevents integral windup during field weakening calculations. Adder 244 may receive the field weakening adjustment signal from integrator 243 and add it to the received rotor angular velocity signal to generate the field weakening command for motor 110. As discussed above, the rotor angular velocity signal may be received from sensor 160. The field weakening command may be output from adder 244 to current command generator 210 to be used as an input to lookup tables 212 and 214, as discussed above.

Lookup tables 212 and 214 may be generated using an iterative computer calculation technique that calculates a torque current command and a flux current command for each corresponding torque command value and rotor angular velocity value. Lookup tables 212 and 214 may be generated based on the properties and performance characteristics of a particular motor.

Figure 3:
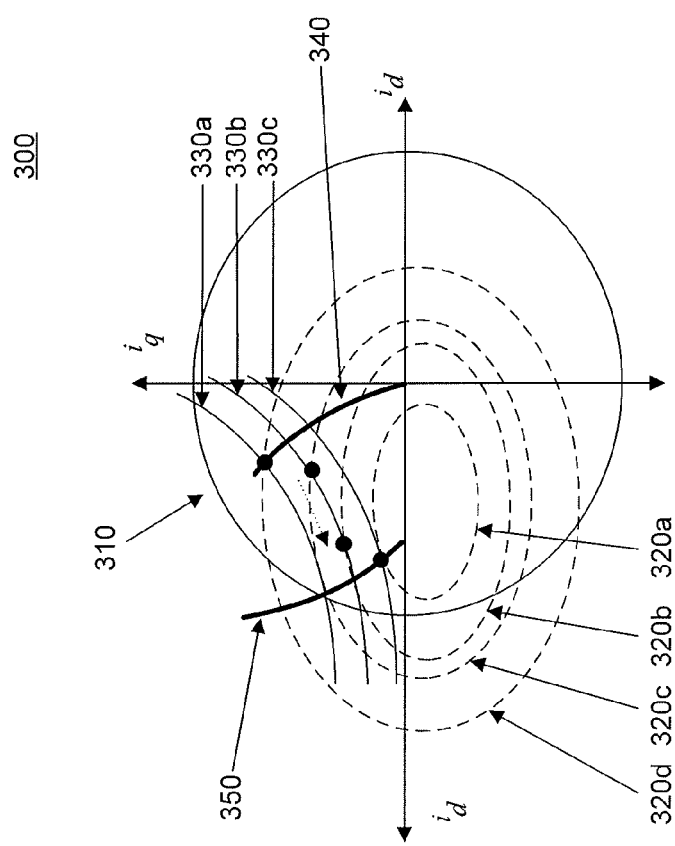
FIG. 3 is a graph illustrating operating regions of a motor.

For example, FIG. 3 is a graph 300 illustrating operating regions of an exemplary motor. Graph 300 includes a maximum current circle 310, constant angular velocity ovals 320a, 320b, 320c, and 320d, constant torque curves 330a, 330b, and 330c, maximum torque per ampere curve 340, and maximum torque per flux curve 350.

Maximum current circle 310 may be generated based on the maximum current that is achievable due to limitations on DC bus 140. For example, a maximum current that may be applied by inverter 120 to motor 110 may be limited by the DC bus voltage to a certain value, $I_{dc}$. Thus, the maximum total current requirement can be represented as $i_d^2 + i_q^2 \leq I_{dc}^2$. This requirement yields maximum current circle 310, having radius $I_{dc}$. In some embodiments, $I_{dc}$ may be limited based on other factors, such as a set maximum current, the current regulator, the inverter, etc.

Constant angular velocity ovals 320a, 320b, 320c, and 320d represent the various current command combinations, represented as points ($i_d$, $i_q$) on each oval, that are capable of operating motor 110 at a particular rotor angular velocity. In other words, all of the possible combinations of $i_d$ and $i_q$ represented by a constant angular velocity oval will result in the rotor of motor 110 operating at the particular angular velocity corresponding to that oval. Further, the angular velocity represented by each oval increases as the radius of the oval decreases. Thus, constant angular velocity oval 320a represents an angular velocity that is higher than the angular velocity represented by constant angular velocity oval 320b, which, in turn, is higher than the angular velocity represented by constant angular velocity oval 320c, etc. Constant angular velocity ovals 320a-320d may be calculated based on the physical characteristics of a particular motor 110. For example, constant angular velocity ovals 320a-320d may be represented by the following equation:

$$\left(i_d + \frac{\varphi_m}{L_d}\right)^2 + \left(\frac{L_q}{L_d}\right)^2 i_q^2 = \left(\frac{2V_{dc}}{\pi L_d}\right)^2 \frac{1}{\omega^2} \qquad (2)$$

where $i_d$ represents the flux current component, $i_q$ represents the torque current component, $\phi_m$ represents the magnetic flux linkage, $L_d$ represents the d-axis stator self-inductance, $L_q$ represents the q-axis stator self-inductance, $V_{dc}$ represents the DC bus voltage, and $\omega$ represents the rotor angular velocity.

Constant torque curves 330a, 330b, and 330c represent the current required to operate motor 110 at a particular torque level. In other words, all of the possible combinations of ($i_d$, $i_q$) represented by a constant torque curve will result a particular mechanical torque output from motor 110. Further, constant torque curve 330a represents a mechanical torque output that is higher than the mechanical torque output represented by constant torque curve 330b, which, in turn, is higher than the mechanical torque output represented by constant torque curve 330c. Constant torque curves 330a-330c may be calculated based on the physical characteristics of a particular motor 110. For example, constant torque curves 330a-330c may be represented by the following equation;

$$T_e = \frac{3}{2} p[\varphi_m i_q - (L_q - L_d) i_q i_d] \qquad (3)$$

where p represents the number of poles, $i_d$ represents the flux current component, $i_q$ represents the torque current component, $\phi_m$ represents the magnetic flux linkage, $L_d$ represents the d-axis stator self-inductance, and $L_q$ represents the q-axis stator self-inductance.

Lookup tables 212 and 214 may be generated based on the intersection of the constant angular velocity ovals and the constant torque curves. For example, the intersection point ($i_d$, $i_q$) of each constant torque curve and each constant angular velocity oval represents a flux signal $i_d$ and a torque signal $i_q$. Thus, an entry in flux current command lookup table 214 may be generated by adding: as the torque command, the torque value corresponding to the constant torque curve; as the field weakening command, the angular velocity corresponding to the constant angular velocity oval; and as the flux current command, the $i_d$ coordinate value corresponding to the intersection point of the constant torque curve and the constant angular velocity oval. Similarly, an entry in torque current command lookup table 212 may be generated by adding: as the torque command, the torque value corresponding to the constant torque curve; as the field weakening command, the angular velocity corresponding to the constant angular velocity oval; and as the torque current command, the $i_q$ coordinate value corresponding to the intersection point of the constant torque curve and the constant angular velocity oval. This process may be repeated for the intersection of each constant velocity oval and each constant torque curve to generate multiple entries in flux current command lookup table 214 and torque current command lookup table 212. Further, while only four constant angular velocity ovals 320a-320d and three constant torque curves 330a-330c are shown in FIG. 3, any number of constant angular velocity ovals and constant torque curves may be used to generate lookup tables 212 and 214.

Maximum torque per ampere curve 340 represents the maximum mechanical torque output from motor 110 at varying current commands. Maximum torque per ampere curve 340 may be calculated based on the physical characteristics of a particular motor 110. Further, as shown in FIG. 3, at lower rotor angular velocities, maximum torque per ampere curve 340 may represent the intersection points of the constant angular velocity ovals and the constant torque curves. For example, maximum torque per ampere curve 340 coincides with the intersection of constant angular velocity oval 320d and constant torque curve 330a. Thus, in some embodiments, maximum torque per ampere curve 340 may represent the outputs of lookup tables 212 and 214 at lower rotor angular velocities.

Maximum torque per flux curve 350 represents the various torque and flux current commands that will generate the minimum flux for a desired mechanical torque output from motor 110. Maximum torque per flux curve 350 may be calculated based on the physical characteristics of a particular motor 110. Further, as shown in FIG. 3, at higher rotor angular velocities, maximum torque per flux curve 350 may represent the intersection points of the constant angular velocity ovals and the constant torque curves. For example, maximum torque per flux curve 350 coincides with the intersection of constants angular velocity oval 320a and constant torque curve 330c.

FIG. 3 also demonstrates the effects of field weakening command generator 240 on control system 100. Specifically, as discussed above, field weakening command generator 240 may generate a field weakening adjustment signal that is output from integrator 243. This field-weakening adjustment signal may be added to the rotor angular velocity signal from sensor 160. Thus, field weakening command generator 240 may add to the rotational angular velocity signal in order to create the field weakening command that is input into lookup tables 212 and 214. This addition to the rotor angular velocity signal may have a field weakening effect, which can be understood by reference to FIG. 3. For example, without the field weakening adjustment signal added to the rotor angular velocity signal, the current commands output by lookup tables 212 and 214 may refer to the point represented by the intersection of constant torque curve 330b and constant angular velocity oval 320c. However, by adding the field-weakening adjustment signal to the rotor angular velocity, the effective angular velocity increases (corresponding to a shrinking constant angular velocity oval), and can no longer be represented by constant angular velocity oval 320c. Instead, the new operation point may be represented by the intersection of constant torque curve 330b and constant angular velocity oval 320b. As shown by the dotted arrow in FIG. 3, this shifts the operating point toward maximum torque per flux curve 350, effectively reducing the flux and thereby performing a field-weakening operation.

INDUSTRIAL APPLICABILITY

Figure 4:
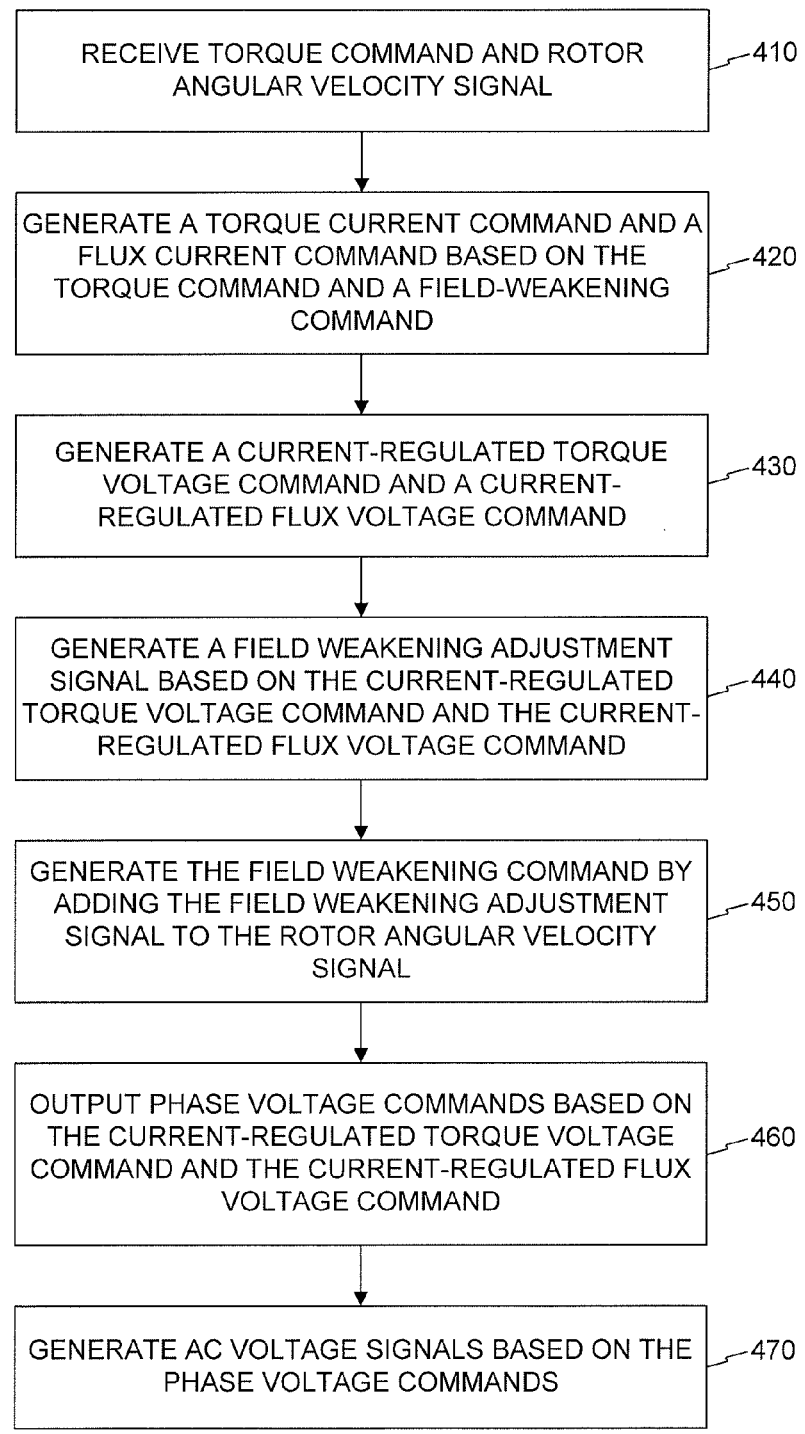
FIG. 4 is a flow chart illustrating an exemplary disclosed method of operating the system of FIG. 1.

The disclosed motor control system may be applicable to any machine that includes a motor. In particular, the disclosed motor system may be applicable to traction motors used to drive transportation and construction machines, etc. The disclosed motor control system may cause the motor to operate more efficiently during a field weakening operation by calculating a field weakening command based on the rotor angular velocity of the motor to provide achievable current commands for controlling the current regulator. Further, by using the rotor angular velocity of the motor as a field weakening command, unnecessary calculations and/or components are eliminated, making the process less resource intensive. The operation of the motor control system will now be explained in connection with the flowchart of FIG. 4.

During operation of control system 100, an operator of a device that includes control system 100 may send a torque command to controller 150. The torque command may indicate a desired torque output for motor 110. For example, the operator may generate the torque command through use of an accelerator pedal or other similar device. In addition to receiving the torque command, controller 150 may also receive a rotor angular velocity signal from sensor 160 (Step 410).

Controller 150 may generate a torque current command and a flux current command (Step 420). Controller 150 may generate the torque current command and the flux current command based on the torque command and a field-weakening command. For example, controller 150 may reference torque current command lookup table 212 and flux current command lookup table 214 to determine the torque current command and the flux current command, respectively, based on the received torque command and the field-weakening command.

Controller 150 may generate a current-regulated torque voltage command and a current-regulated flux voltage command based on the torque current command and the flux current command, respectively (Step 430). For example, current regulator 220 of controller 150 may convert the current commands into current-regulated voltage commands.

Controller 150 may generate a field weakening adjustment signal based on the current-regulated torque voltage command and the current regulated flux voltage command (Step 440). For example, controller 150 may generate a modulation index by dividing the square root of the sum of squares of the flux voltage command and the torque voltage command by a DC bus value $V_{dc}$. Controller 150 may then subtract a predetermined modulation threshold value from the modulation index. As described above, the modulation threshold may be any number between 0 and 1. In a embodiment, the modulation threshold value may be approximately 0.95. Controller 150 may then integrate the resulting signal to generate the field weakening adjustment signal (Step 440).

Controller 150 may generate the field weakening command that is used to generate the torque current command and the flux current command by adding the field-weakening adjustment signal to the rotor angular velocity signal received in Step 410 (Step 450).

At about the same time as completing Steps 440-450, controller 150 may output phase voltage commands to inverter 120 based on the current-regulated torque voltage command and current-regulated flux voltage command generated in Step 430 (Step 460). For example, controller 150 may convert the flux and torque voltage commands in the DQ coordinate plane into any number of AC phase voltage commands, such as two, three, four, or five phase AC voltage commands.

Inverter 120 may generate AC voltage signals to be applied to motor 110 based on the phase voltage commands generated by controller 150 in Step 460 (Step 470). For example, the AC voltage signals may be applied to stator windings on motor 110, which may result in forces being applied to the rotor of motor 110, causing the rotor to rotate.

The disclosed motor control system may help improve motor efficiency. In particular, the system and method may provide efficient operation of the motor during a field weakening operation by calculating a field weakening command based on the rotor angular velocity of the motor to provide achievable current commands for controlling the current regulator. Further, by using the rotor angular velocity of the motor as a field weakening command, unnecessary calculations and/or components may be eliminated, making the process less resource intensive.

It will be apparent to those skilled in the art that various modifications and variations can be made to the disclosed motor control system. Other embodiments will be apparent to those skilled in the art from consideration of the specification and practice of the disclosed motor control system. It is intended that the specification and examples be considered as exemplary only, with a true scope being indicated by the following claims and their equivalents.

What is claimed is:

1. A control system comprising:
a motor;
a sensor configured to generate a rotor angular velocity signal indicative of an angular velocity of a rotor of the motor; and
a controller configured to:
receive a torque command;
receive the rotor angular velocity signal from the sensor;
generate a field weakening command for the motor by adding a field weakening adjustment signal to the rotor angular velocity signal;
calculate a modulation index about equal to the square root of the sum of squares of a flux voltage command and a torque voltage command divided by a maximum DC bus voltage; and
generate the field weakening adjustment signal by integrating a signal corresponding to the modulation index minus a modulation threshold value.

2. The control system of claim 1, further including:
an inverter;
the controller being further configured to:
generate the torque voltage command and the flux voltage command based on the torque command and the field weakening command;
convert the torque voltage command and the flux voltage command into phase voltage commands; and
output the phase voltage commands to the inverter, the inverter being configured to:
receive the phase voltage commands from the controller; and
apply AC voltage signals to the motor based on the phase voltage commands.

3. The control system of claim 1, wherein the motor is an interior permanent magnet motor.

4. The control system of claim 1, wherein the modulation threshold value is between 0 and 1.

5. The control system of claim 2, the controller being further configured to:
receive the AC voltage signals from the inverter; and
generate a torque feedback current signal and a flux feedback current signal based on AC current feedback signals received from the inverter.

6. The control system of claim 5, the controller being further configured to:
generate a torque current command and a flux current command based on the torque command and the field weakening command;

generate the torque voltage command based on a comparison of the torque feedback current signal and the torque current command; and generate the flux voltage command based on a comparison of the flux feedback current signal and the flux current command.

7. A method for controlling a motor comprising:
receiving a torque command;
receiving a signal indicative of a rotor angular velocity of the motor;
generating a field weakening command by adding a field weakening adjustment to the rotor angular velocity;
outputting AC voltage signals to the motor based on the field weakening command;
calculating a modulation index about equal to the square root of the sum of squares of a current-regulated flux voltage command and a current-regulated torque voltage command divided by a maximum DC bus voltage; and
generating the field weakening adjustment by integrating modulation index minus a modulation threshold value.

8. The method of claim 7, further including:
generating a torque current command and a flux current command based on the torque command and the field weakening command;
generating the current-regulated torque voltage command and the current-regulated flux voltage command based on the torque current command and the flux current command; and
outputting the AC voltage signals from an inverter to the motor based on the current-regulated torque voltage command and the current-regulated flux voltage command.

9. The method of claim 7, wherein the modulation threshold value is between 0 and 1.

10. The method of claim 8, further including:
converting the cur ent-regulated torque voltage command and the current-regulated flux voltage command into phase voltage commands, wherein the AC voltage signals output to the motor are based on the phase voltage commands.

11. The method of claim 8, further including generating a torque feedback current and a flux feedback current based on AC current feedback signals from the inverter, wherein:
generating the current-regulated torque voltage command includes generating the current-regulated torque voltage command based further on the torque feedback current; and
generating the current-regulated flux voltage command include generating the current regulated flux voltage command based further on the flux feedback current.

12. A controller for a motor, the controller comprising:
a current command generator configured to receive a torque command and a field weakening command, and generate a torque current command and a flux current command;
a current regulator configured to receive the torque current command and the flux current command, generate a torque voltage command and a flux voltage command, and use the torque voltage command and the flux voltage command to control voltage signals applied to the motor;
a field weakening command generator configured to generate the field weakening command received by the current command generator by adding a field weakening adjustment signal to a rotor angular velocity signal;
wherein the field weakening command generator further includes:
a modulation index calculator that calculates a modulation index about equal to the square root of the sum of squares of the flux voltage command and the torque voltage command divided by a maximum DC bus voltage; and
an integrator that generates the field weakening adjustment signal by integrating a signal corresponding to the modulation index minus a predetermined modulation threshold value.

13. The controller of claim 12, wherein the modulation threshold value is between 0 and 1.

14. The controller of claim 12, wherein the modulation threshold value is approximately 0.95.

15. The controller of claim 12, further including:
a phase voltage command generator that converts the torque voltage command and the flux voltage command into phase voltage commands.

16. The controller of claim 15, further including:
an inverter configured to receive the phase voltage commands from the phase voltage command generator and apply AC voltage signals to the motor based on the phase voltage commands.

17. The controller of claim 15, further including:
a current signal feedback generator that receives AC voltage signals being applied to the motor and generates a torque feedback current signal and a flux feedback current signal, wherein
the current regulator s configured to receive the torque feedback current signal and the flux feedback current signal from the current signal feedback generator, generate the torque voltage command based on the torque current command and the torque feedback current signal, and generate the flux voltage command based on the flux current command and the flux feedback current signal.

* * * * *